United States Patent
Armand et al.

(10) Patent No.: US 10,944,453 B2
(45) Date of Patent: Mar. 9, 2021

(54) OBJECT DETECTION FOR BEAMFORMING CONFIGURATION AND COVERAGE OPTIMIZATION

(71) Applicant: T-Mobile USA, Inc., Bellevue, WA (US)

(72) Inventors: Ahmad Armand, Sammamish, WA (US); Karri Mikael Kuoppamaki, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 177 days.

(21) Appl. No.: 15/792,182

(22) Filed: Oct. 24, 2017

(65) Prior Publication Data
US 2019/0123797 A1    Apr. 25, 2019

(51) Int. Cl.
*H04B 7/06* (2006.01)
*H01Q 3/26* (2006.01)
*H01Q 1/24* (2006.01)
*H04B 7/08* (2006.01)
*H01Q 3/40* (2006.01)

(52) U.S. Cl.
CPC ........... *H04B 7/0617* (2013.01); *H01Q 1/246* (2013.01); *H01Q 3/2647* (2013.01); *H01Q 3/40* (2013.01); *H04B 7/086* (2013.01)

(58) Field of Classification Search
None
See application file for complete search history.

(56) References Cited

U.S. PATENT DOCUMENTS

| | | | |
|---|---|---|---|
| 5,805,067 A * | 9/1998 | Bradley | H04B 1/3838 340/635 |
| 7,859,458 B2 | 12/2010 | Uno et al. | |
| 9,791,561 B2 | 10/2017 | Rhee et al. | |
| 2003/0071749 A1 | 4/2003 | Yu | |

(Continued)

FOREIGN PATENT DOCUMENTS

| EP | 2760233 A1 | 7/2014 |
|---|---|---|
| WO | WO2015/200009 A1 | 12/2015 |

OTHER PUBLICATIONS

PCT Search Report and Written Opinion dated Jan. 25, 2019, for PCT Application No. PCT/US2018/055236, 9 pages.

*Primary Examiner* — Whitney Moore
(74) *Attorney, Agent, or Firm* — Lee & Hayes, P.C.

(57) ABSTRACT

In a cellular communication system, particularly in a system using GHz frequencies, communication signals may become blocked by physical objects. As a result, communications may be disrupted or prevented. In a cellular system using beamforming and directional signal beams, a beam is tested prior to its use by sending a discovery signal over the beam, and by detecting any reflections of the discovery signal. A reflection may indicate the presence of a blocking object in the direction of the beam. By repeating this process using different directional beams, it is possible to produce a map of an area surrounding the base station, and to subsequently select or configure a directional beam for communicating with an individual user device. The process may also be used when selecting the antenna position and orientation for a new base station, by testing different alternatives and selecting an alternative that has relatively fewer blocking obstructions.

17 Claims, 5 Drawing Sheets

(56) References Cited

U.S. PATENT DOCUMENTS

2012/0178372 A1* 7/2012 Rofougaran ............. H04B 7/04
                                                                455/41.3
2019/0097712 A1* 3/2019 Singh ....................... H04B 7/08

* cited by examiner

OBJECT DETECTION FOR BEAMFORMING CONFIGURATION AND COVERAGE OPTIMIZATION

BACKGROUND

In certain types of cellular communication networks, communications with mobile devices use directional radio signals that are implemented using techniques referred to as beamforming. Specifically, a base station used in a cellular communications network may have an array of antennas that are used to form multiple directional signals, each of which extends in a different radial direction from the base station. This allows much more efficient use of limited bandwidth, and is particularly useful in higher frequency bands.

At any given location, a user device monitors detectable directional signals and selects the signal having the best signal quality. The user device communicates this selection to the base station, and future communications with the user device are conducted using the selected signal. As the user device moves geographically, it continually monitors available signals and repeats the signal selection described above. A moving device may therefore use a continually changing sequence of different signals, corresponding to different signal beams, for communication with the cellular network.

Beamforming will be increasingly used in $5^{th}$-Generation (5G) mobile networks, although it may be used to some extent in $4^{th}$-Generation (4G) and Long-Term Evolution (LTE) mobile networks. Beamforming is likely to be more frequently implemented for use in higher radio frequency bands, such as the bands referred to as millimeter bands, which are in the spectrum between 30 GHz and 300 GHz. At these higher frequencies and corresponding short wavelengths, it becomes more feasible to deploy large antenna arrays that can generate narrower beams and enable more directional (or focused) beamforming. Although propagation distances are shorter when using these higher frequencies, the availability of beamforming allows more efficient use of the available spectrum.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
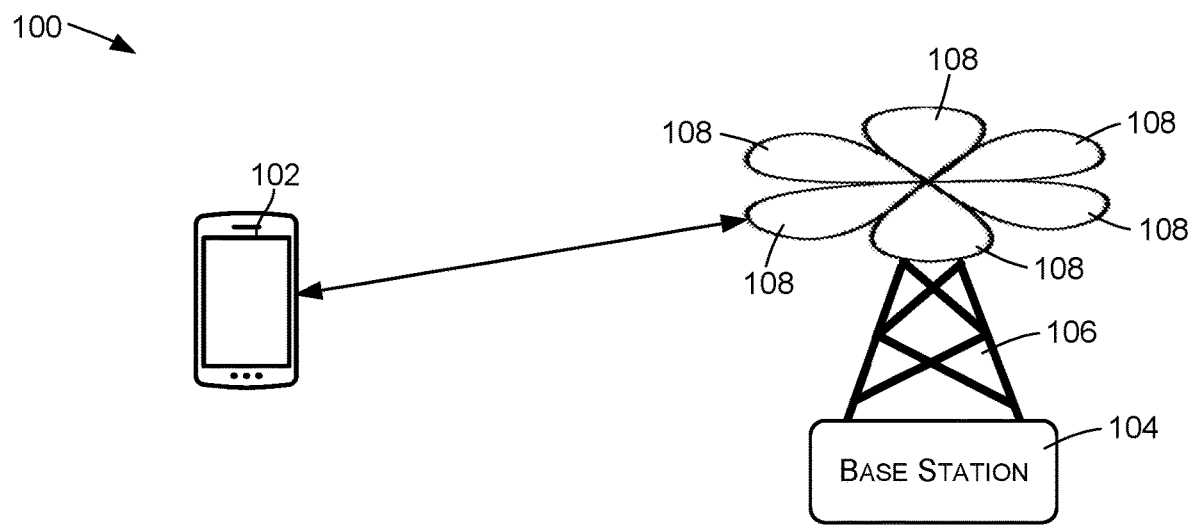
FIG. 1 is a diagram of an environment that includes components for using directional beams when communicating between a base station and a user device.

In an example embodiment described herein, a cellular base station uses an antenna array, sometimes referred to as a phased array, to produce multiple signal beams that extend outward in different directions, including different horizontal directions and different vertical directions. An antenna array such as this may have a large number of individual antennas, such as tens, hundreds, thousands, or even more antennas. The beams are created by appropriately processing the signals to or from the antennas in an appropriate manner. The signal processing is based on a set of parameters referred to as a steering matrix. The steering matrix defines the directions and shapes of multiple directional beams that can be used for both transmitting and receiving.

At certain times, such as prior to data transmissions, the base station sends one or more discovery signals to determine channel conditions, and specifically to check for the presence of physical objects that may obstruct any one or more directional signals. More specifically, the base station may periodically send a discovery signal over each of its directional beams, monitor the beams for reflections of the discovery signal, and analyze the reflections to estimate the presence, location, and/or size of objects within the range of the base station. Based on this information, the base station may reconfigure one or more of its directional beams to avoid the physical obstruction or to otherwise reduce beam scanning and beam search times, save energy at the base station and UE (battery power), and improve signal quality between the base station and one or more mobile devices or other user devices. In some embodiments, the object and/or blockage information obtained in this manner may be used to generate or to augment a three-dimensional map of the vicinity of the base station, and the map may be used to determine optimal beam patterns.

The discovery signal may comprise a radio frequency signal, and in some cases may have the same frequency as used for actual communications with user devices. The discovery signal may be modulated in a recognizable manner to that its reflections can be detected. For example, the discovery signal may comprise a transmission of a unique data pattern or sequence, using the same modulation or coding technique that is otherwise being used for data communications with user devices. The discovery signal may be transmitted, and its reflections detected, by the same transmitter and receiver as used for such data communications.

The described techniques may also be used or implemented by devices other than base stations, such as user cellular devices. For example, a user device might use these techniques to examine its local surrounding for blockages. Information obtained in this manner would make beam searching by the user device more efficient, even before establishing communication with the base station. Additionally, once in communication with the base station, the user device can inform the base station about the blockages, which would make overall beam scanning, beam search, and beam selection process even more efficient.

FIG. 1 illustrates an example environment 100 within which the described techniques may be implemented. In FIG. 1, a mobile device or other user device 102, also referred to as user equipment (UE) or as a mobile station (MS), communicates with a base station 104. The user device 102 may comprise any type of device capable of wireless communications with the base station 104, such as a cell phone, a smartphone, a computer, a tablet computer, an automotive control/monitoring system, etc.

The base station 104 comprises equipment that is most often in a fixed location and that includes transceivers and antennas for communicating with multiple user devices. In the illustrated example, the base station 104 includes a tower 106 upon which are mounted multiple antennas (not shown) that are used for beamforming.

In some embodiments, the base station 104 and the user device 102 may be part of a cellular communication system, such as a GSM (Global System for Mobile Communications), CDMA (Code Division Multiple Access), LTE (Long Term Evolution), or 5G (Fifth Generation) network. The described techniques may be used in various implementations of such networks and other networks, including high-frequency implementations of 5G (Fifth Generation) networks.

FIG. 1 shows a simplified example of directional signal beams 108 that may be formed by the base station 104. In this example, each beam 108 has a beam pattern that extends in a respectively unique radial direction relative to the base station 104, although there may be some overlap of adjacent beams. Although FIG. 1 shows six signal beams for purposes of illustration, certain embodiments may use many more signal beams, such as 20 to 100 or more signal beams, each of which is directed in a different direction. The width of each signal beam is generally decreased with increasing numbers of beams.

In FIG. 1, the signal beams are shown as being in different horizontal directions relative to the base station 104. That is, each signal beam corresponds to an azimuth or a range of azimuths. However, signal beams may also vary in a vertical direction or angle, which is referred to as tilt. A beam may have an uptilt, meaning that the beam is angled upward relative to horizontal, or a downtilt, meaning that the beam is angled downward relative to horizontal.

As will be described in more detail below, the beams and corresponding beam patterns are produced by processing signals based on provided processing parameters. The beams and beam patterns can be configured and reconfigured at any time by varying these processing parameters. In operation, the user device 102 samples any received or detectable signals for selection one of the signals that will be used for communicating with the base station 104. For example, the signal having the strongest or highest quality signal may be selected. Communications between the user device 102 and the base station 104 are then conducted using the selected signal. The user device 102 may continually monitor signal strengths of received signals, and signal selection may change as the user device 102 moves geographically or the propagation environment changes between the base station 104 and the user device 102. Although FIG. 1 shows an example of a base station using beamformed signals, the user device 102 might also have multiple antenna elements, which the user device 102 might use to implement directional signals in a similar manner.

Figure 2:
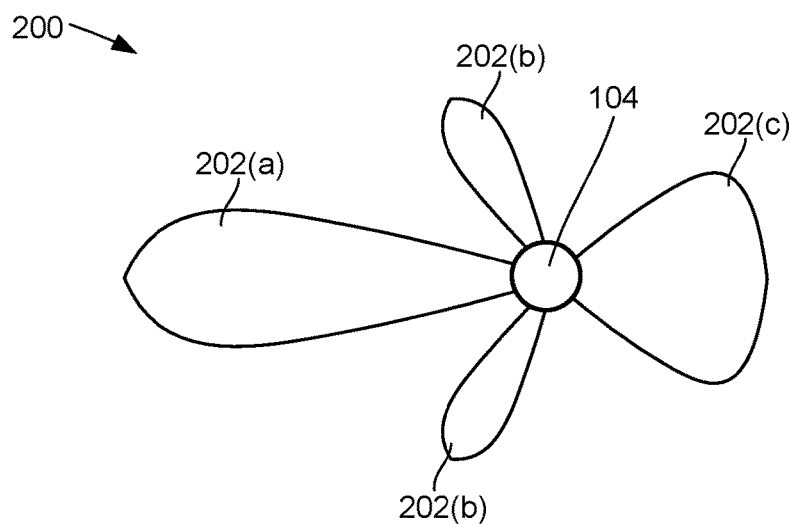
FIG. 2 is a diagram illustrating an example directional beam.

FIG. 2 shows a more detailed example of a single directional beam pattern 200 that may be produced by the base station 104 and/or by the user device 102. The beam pattern 200 includes one or more lobes 202, which in this example include a main lobe 202(a) and one or more side lobes 202(b). Signal strength, either as transmitted or received, is strongest at points within the main lobe 202(a). The side lobes 202(b) represent areas of significant but possibly lower signal strength. In some cases, the beam pattern 200 may additionally, or alternatively, be characterized as having a null lobe 202(c), representing an area within which signal strength is weak or weakest. The beam direction is generally considered to be in the direction of the main lobe 202(a).

Beamforming parameters can be varied to achieve various types of beam patterns, and the base station 104 and/or the user device 102 may generate multiple beams having respectively different beam patterns, not limited to the example beam pattern 200 of FIG. 2. Furthermore, a beam pattern may be three dimensional. Generally, the beams and beam patterns of a base station or user device are configured to achieve signal coverage for areas or locations around the base station or user device.

As used herein, the terms "beam" and "signal beam" are used to indicate a path or area through which radio waves are received and/or transmitted. The term "beam pattern" refers to the nominal radio wave coverage area of a particular signal beam, and may include azimuth, tilt, width, shape etc.

Figure 3:
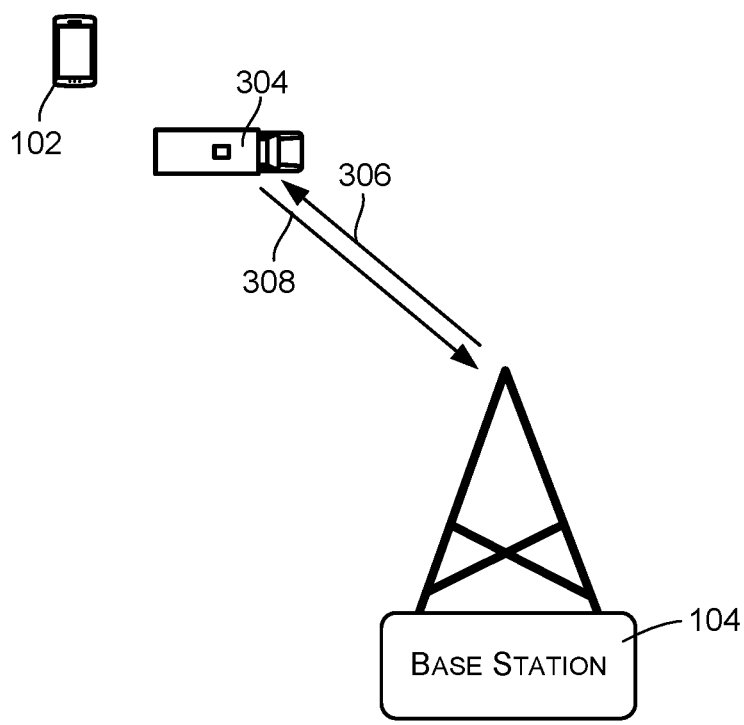
FIG. 3 is a diagram illustrating how a directional signal may be blocked by a physical object.

FIG. 3 illustrates a situation in which a signal between the base station 104 and the user device 102 has been blocked. FIG. 3 assumes that communications between the base station 104 and the user device 102 have been carried by a directional signal corresponding to a particular directional beam in the direction of the user device 102. However, an obstacle 304, in this example a vehicle such as a truck, has moved into the direct path between the base station 104 and the user device 102, potentially blocking communications between the base station 104 and the user device 102.

Generally, signals corresponding to a particular directional beam may be blocked by any type of obstacle such as a building, a tree, a vehicle, and so forth. This is particularly true in systems that use very high frequencies, such as frequencies in the spectrum between 30 GHz and 300 GHz, sometimes referred to as millimeter bands or as mmWave bands. In addition, high-frequency signals are highly subject to reflections. That is, a high-frequency signal beam may be reflected by one or more objects and therefore be directed in one or more different directions, other than the original direction of the signal. One result of this is that signals may propagate over multiple paths to a single user device, and a signal may reach the user device 102 despite blockage of the direct path between the base station 104 and the user device 102.

In the example of FIG. 3, the base station 104 has been configured to transmit a discovery signal 306 in the direction of the user device 102, using the same directional signal beam that has been used for communicating with the user device 102. The base station then monitors the signal beam, or any number of other signal beams, to detect any reflection 308 of the discovery signal 306 back to the base station 104. A received reflection of the discovery signal 306 may indicate to the base station 104 that there is an obstacle in the direction of the user device 102, and that it may therefore be difficult to utilize the corresponding signal beam for communicating with the user device 102. Upon detecting the obstacle, the base station 104 may attempt to work around the blocking obstacle by reconfiguring its directional beams to have different directions and/or beam patterns, in order to improve the overall coverage area of the base station 104 despite the presence of the obstacle 304.

In operation, the base station may be configured to periodically send a discovery signal over each of multiple signal beams. When a reflection of a discovery signal is received through any signal beam of the signal beams, the signal beams can be reconfigured to account for the presence of an obstacle in the path of the signal beam.

The user device 102 may be configured in the same manner. For example, a user device might implement multiple directional signal beams, and may periodically send a discovery signal over each of the directional signal beams to detect surrounding signal obstacles.

Figure 4:
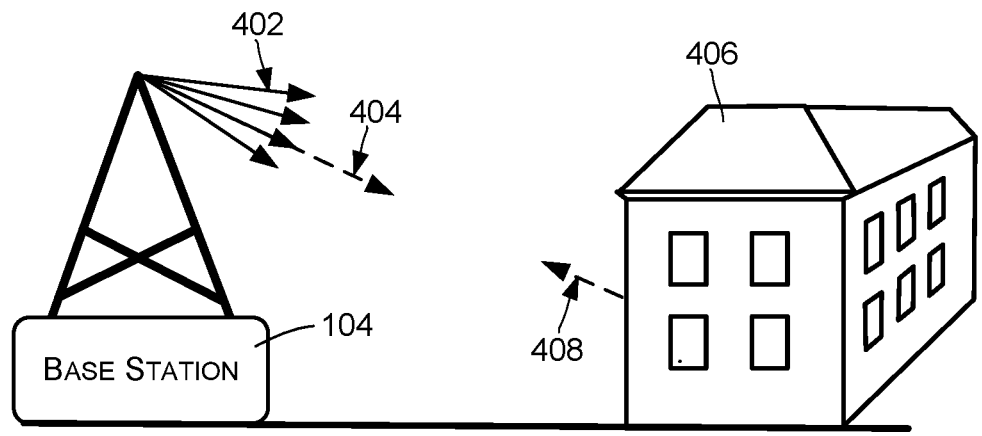
FIG. 4 is a diagram illustrating the use of multiple directional beams for detecting physical objects.

FIG. 4 illustrates an example of using one or more directional signal beams 402 that may be used for transmitting a discovery signal 404. The illustrated signal beams 402 are representative of any number of signal beams that may be transmitted by the base station 104 in different directions. In some implementations, each of the beams 402 may be able to be steered in the horizontal and vertical directions.

A discovery signal 404 transmitted on any of the signal beams 402 may be used for object detection. In FIG. 4, discovery signals are used to detect the presence of a building 406. Detected objects may include permanent, stationary objects such as the building 406, as well as moving or transitory objects such as people, automobiles, handheld objects, etc.

The discovery signal 404 may have a known waveform, such as having a known amplitude, frequency, and phase. The discovery signal 404 may be transmitted for a very short period of time and then repeated after another short period for reflected signal reception. In some cases, the discovery signal 404 may comprise a series of pulses with known amplitude, pulse duration and repetition rate. The discovery signal pulse duration may be relatively short, while being long enough to have enough energy to overcome propagation losses, to travel to a potential distant object in the cell coverage, and once reflected from that object have enough energy to overcome return losses and arrive at the base station receiver with a strength above the receiver sensitivity.

A discovery signal can be assigned a portion or all of the base station or user device bandwidth for brief discovery periods. It is also possible to use a specific, dedicated frequency band, other than the base station bandwidth, for the discovery signal. In the latter case, the discovery signal may have a frequency that is relatively close to the base station's operational frequency band, so that obtained channel information is similar to what would have been obtained if the discovery signal was in the operational frequency band of the base station.

5G mmWave base stations and handset are expected to be capable of beamforming using an array of antenna elements. In the example of FIG. 4, antenna elements of the base station 104 have formed four independent beams, which may be used to transmit corresponding discovery signals.

Object detection may be performed by beam scanning throughout the medium and listening for reflected signals, such as a reflected signals 408, from the surrounding objects. One technique would be to transmit a discovery signal on one beam and listen on all of the beams. This process would be repeated, each time transmitting on a different beam 402 and receiving on all of the beams until all beams have been used for transmission. Depending on the direction of the reflection from an object, the reflected signal strength received through different beams would be different. Signal strength, time and angle of arrival of the reflected signal 406, received through multiple beams 402, may enable more accurate determination of the presence of a blocking object and estimation of reflecting object's position.

The information obtained in this manner can be used to optimize a process of beam selection for communication between a base station and a user device. More specifically, reflected signal characteristics, including strength, time, and angle of arrival, may be used to generate a map of potential object locations and in some cases the extent or size of each object. This map may be incorporated into a pre-existing three-dimensional map of the static environment around the base station, which has been obtained during initial discovery and/or base station installation and integration. The resulting composite map would then comprise a 3D map of the stationary terrain, clutter, structures, etc. surrounding the base station, plus all of the information about the surrounding objects obtained through analysis of beam reflections.

The map integration and/or creation described above can be performed in real-time prior to each actual data transmission. The resulting map may be referred to as a "live" map, in that it is continuously updated to reflect new information regarding the presence or absence of objects. The live map may be used to prioritize the signal beams 402 based on an evaluated level of impairment and to select the beam or beams that are least impaired.

In some embodiments, machine learning algorithms may be used to generate a live map such as this. For example, machine learning techniques may be used to intelligently update the live map based on information gained from each beam scan.

Information obtained by analyzing reflected signals can also be used to select base station location and antenna alignment. By testing at multiple locations within the area of a proposed base station site, it is possible to collect information about blockages at each location, and to use this knowledge to select a base station position and antenna alignment that results in the least blockage.

For cases in which the user device also implements directional signals, the user device may similarly use discovery signals to detect blockages. In some cases, the user device may report information discovered by analyzing reflections of discovery signals to the base station. The base station can then incorporate this additional information in the live map.

Figure 5:
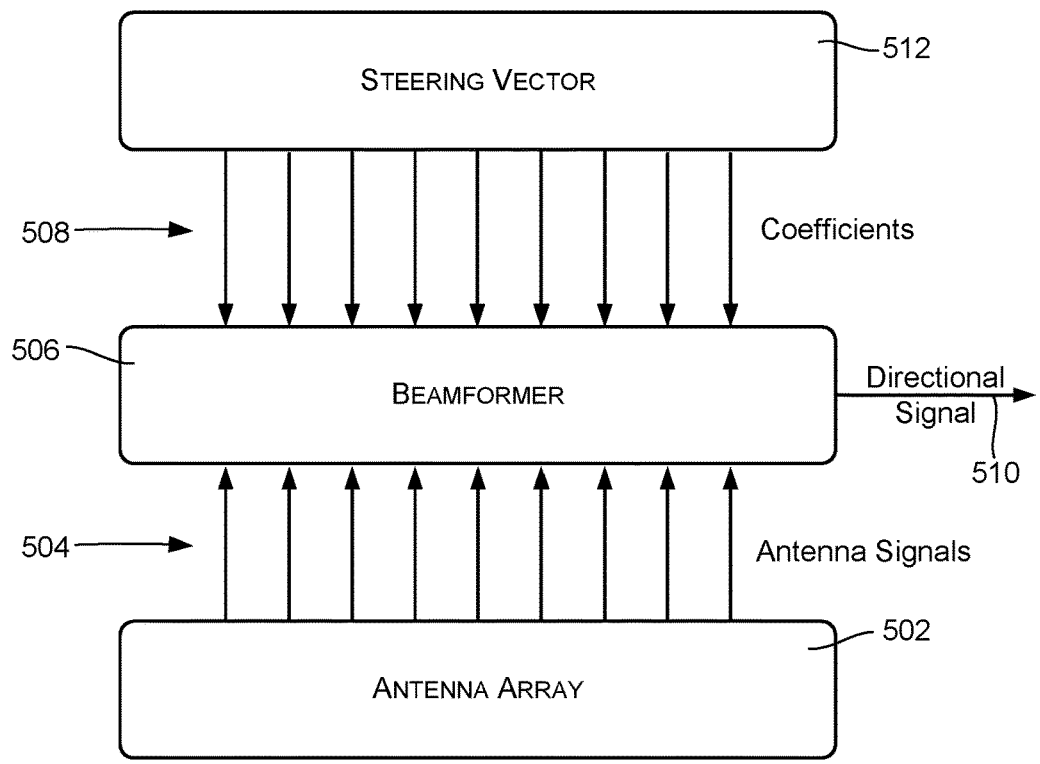
FIG. 5 is a block diagram illustrating an example of how beamforming can be performed in certain embodiments.

FIG. 5 illustrates relevant components that may be used for beamforming in some embodiments. The illustrated components include an antenna array 502, comprising multiple antennas having a known arrangement. The antennas of the array 502 generate respective antenna signals 504.

A beamformer 506 receives the antenna signals 504. The beamformer 506 is responsive to a set of weights or coefficients 508 to create a directional signal 510. The directional signal 510 corresponds to a particular beam pattern, where the beam pattern is defined by the coefficients 508. That is, the directional signal 510 represents radio signals received from within a particular beam pattern as defined by the coefficients 508. The set of coefficients 508 collectively form what is referred to as a steering vector 512. The steering vector 512 can be modified at any time to establish the beam pattern associated with the directional signal 510.

The beamformer 506 may be implemented in various ways. As one example, the beamformer 506 may delay each of the antenna signals 504 in accordance with a corresponding one of the coefficients 508, and then sum the variously delayed signals to produce the directional signal 510.

Although FIG. 5 illustrates the processing of received antenna signals, an analogous process and configuration is used for transmitting directional signals. When transmitting, a beamformer receives a signal, processes the signal based on a steering vector, and provides individual antenna signals to an antenna array 502.

Figure 6:
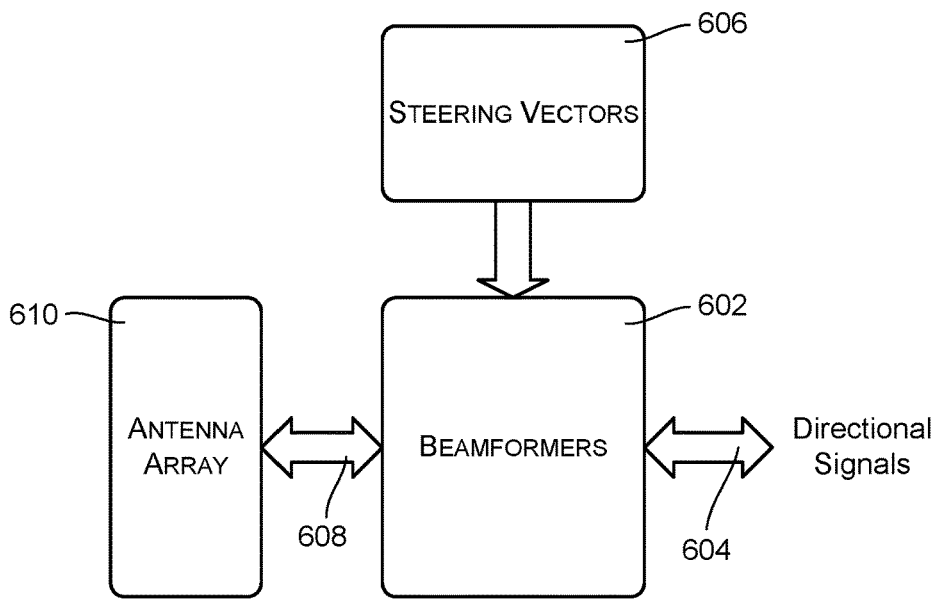
FIG. 6 is a block diagram illustrating how a base station or user device may use multiple beamformers for communications.

FIG. 6 illustrates the use of multiple beamformers 602 to process multiple directional signals 604. In this example, each of multiple beamformers 602 is associated with one of multiple steering vectors 606. When receiving, each of the beamformers 602 is responsive to antenna signals 608 from an antenna array 610 and to the associated one of the steering vectors 606 to form a respective one of the directional signals 604. When transmitting, each of the beamformers 602 is responsive to a received directional signal 604 and to the associated one of the steering vectors 606 to produce the antenna signals 608.

The set of steering vectors 606 may at times be referred to as a steering matrix. Overall configuration of the multiple beams of a base station may be performed by providing an appropriate steering matrix. Furthermore, the beam configuration of a base station may be reconfigured by changing the steering matrix.

Figure 7:
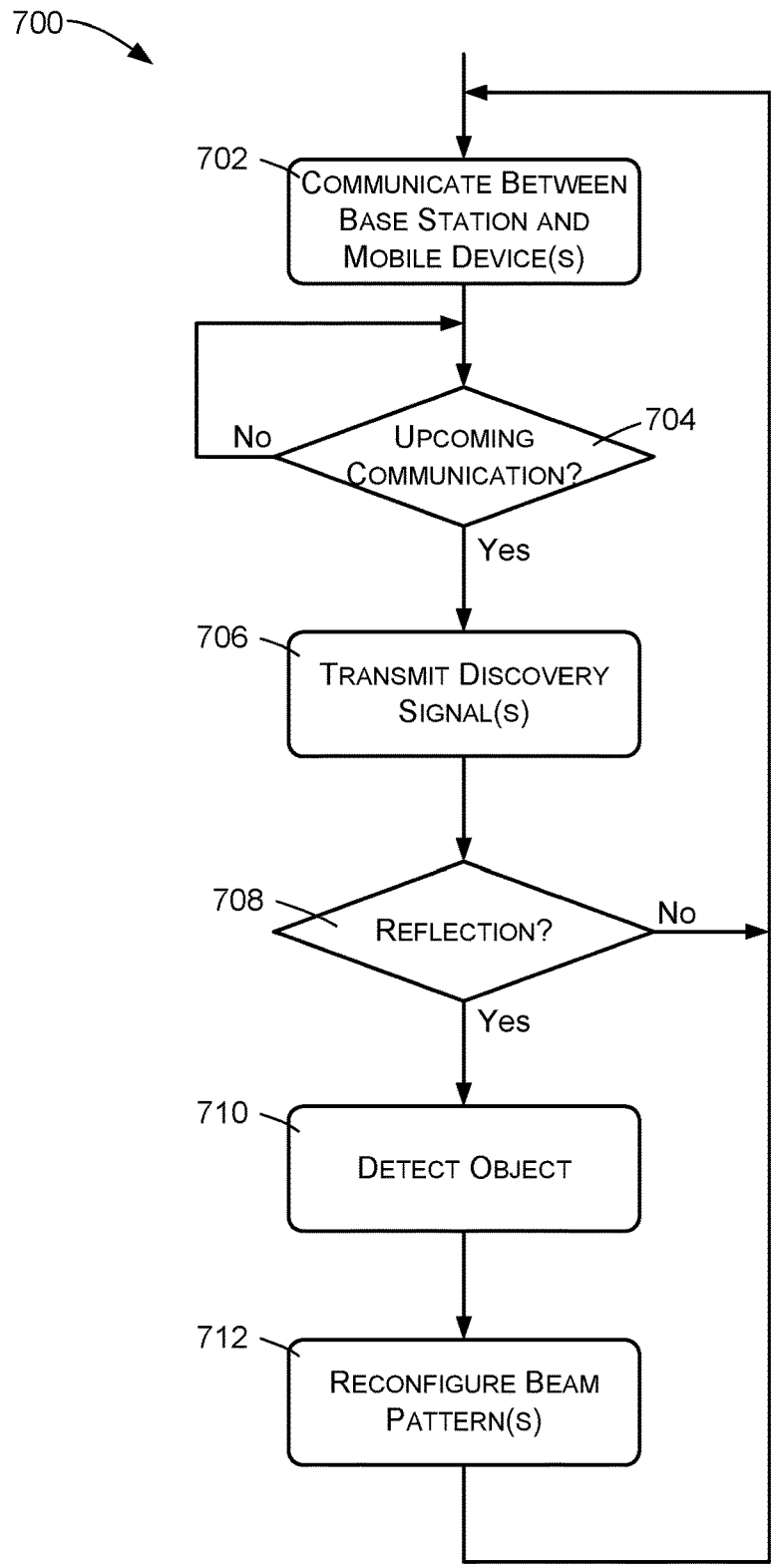
FIG. 7 is a flow diagram illustrating an example method for communicating between a base station and a user device and of configuring a directional beam used for the communicating.

FIG. 7 illustrates an example method 700 of communicating between a base station and a user device. Either or both of the base station and user device may implement this example method, although it will be described primarily as being implemented by the base station.

An action 702 comprises communicating wirelessly between the base station and the user device. For example, the action 702 may comprise sending data to or receiving data from a user device over a directional signal beam. In actual implementation, the action 702 may comprise communicating with multiple devices or entities, using signals over multiple directional signal beams. As described herein, the directional signal beams have corresponding configurable beam patterns.

An action 704 comprises determining whether there is an upcoming communication between the base station and the user device. For example, the action 704 may comprise determining whether there is about to be a data transmission to a user device over a particular directional signal beam. As another example, the action 704 may comprise determining whether the user device is about to transmit data to the base station. The action 704 is performed repeatedly until detecting that there is an upcoming communication.

In this embodiment, beam discovery, starting at the action 706, is performed in response to determining that there is an upcoming data transmission by either the base station or the user device, as determined by the action 704. In other embodiments, however, beam discovery may be performed periodically, repeatedly, and/or in response to events other than data transmissions or data communications.

The action 706 comprises transmitting a discovery signal. The discovery signal may be transmitted using the directional beam of the upcoming data communication, or using any other beam or beams. The signal may have the same radio frequency that is being used for communications with the user device. In some embodiments, either or both of these frequencies are in the mmWave bands above 30 GHz or bands close to mmWave bands like 20-30 GHz.

An action 708 comprises detecting whether there is a reflection of the discovery signal, where it is assumed that the reflection is caused by a physical obstacle or object in the beam pattern of the directional beam over which the discovery signal was transmitted. For example, after transmitting a discovery signal over a particular directional signal beam, the base station may monitor that directional beam and/or other directional beams to determine whether there is a reflection of the discovery signal back to the base station.

If there is no detectable reflection, the method 700 returns to the action 702 of communicating between the base station and the user device.

In some cases, the action 706 may comprise transmitting multiple discovery signals using respectively different directional beams, and the action 708 may comprise checking all such directional beams for reflections of the discovery signals. In some cases, the action 706 may comprise transmitting discovery signals on all of the directional signal beams of the base station or user device, and the action 708 may comprise checking all of the directional beams for reflections of the discovery signals.

An action 710 comprises detecting the presence of an object within the coverage area of the base station, based at least in part on one or more detected reflections of one or more discovery signals. The action 710 in some cases may include determining the location and/or size of the object. In some cases, the action 710 may comprise concluding that there is an obstacle in the direction from which a reflection was detected or in the direction of the beam that was used for the discovery signal.

An action 712, performed in response to determining that there has been a reflection of a discovery signal and/or in response to detecting the presence of an object, comprises reconfiguring the beam patterns of one or more of the directional beams of the base station or user device to avoid or account for the presence of the physical obstacle or object. In some cases, the beam patterns of multiple beams may be adjusted to more efficiently cover a desired coverage area in spite of the presence of the physical obstacle or object. The method 700 then returns to the action 702 of communicating between the base station and the user device.

In some cases, the action 712 may be based not only on the detected object, but on multiple detected objects as well as physical features that are already known to exist within the coverage area of the base station, which may have been determined during base station integration. For example, the action 712 may comprise obtaining a map that indicates physical features of a coverage area and augmenting the map to indicate one or more detected objects. In this case, the action 712 of reconfiguring the beam patterns may be based upon the augmented map.

In some embodiments, the discovery signal may be transmitted using the transmitter that is otherwise being used for communications with the user device, and the reflection of the discovery signal may be detected using the receiver that is otherwise being used for communications with the user device. In other embodiments, dedicated transmitters and receivers may be provided for transmitting discovery signals and detecting their reflections.

As the flow diagram of FIG. 7 illustrates, one or more discovery signals are transmitted repeatedly to detect whether communication with a user device is blocked. In some cases, a discovery signal may be transmitted before each communication with a user device as described. In other cases, discovery signals may be transmitted periodically in order to obtain real-time information regarding the presence and location of physical objects.

Figure 8:
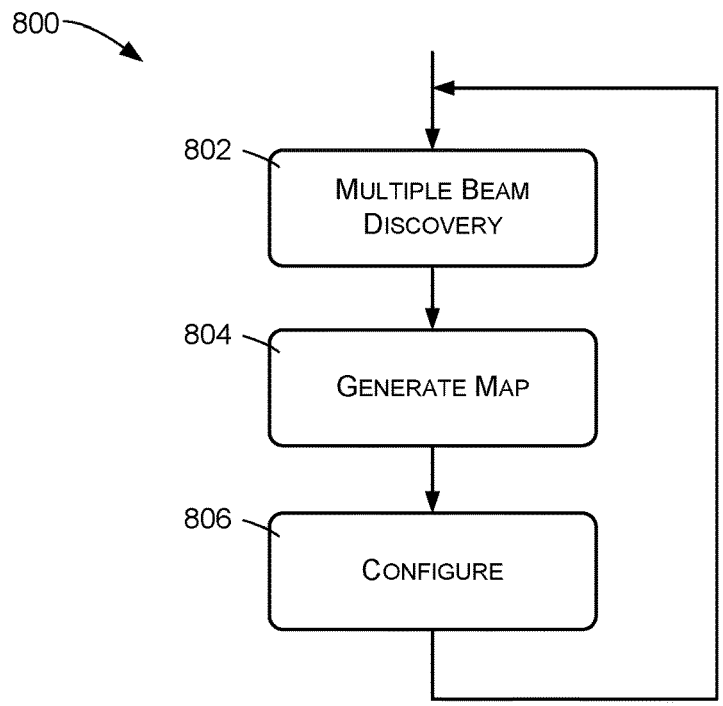
FIG. 8 is a flow diagram illustrating an example method of configuring a base station and/or antenna using directional signal beams.

FIG. 8 illustrates an example method 800 of configuring one or more antennas and/or directional signal beams, such as antennas and signal beams used in a cellular communications system. An action 802 comprises performing beam-based object discovery, as described above. In particular, the action 802 may comprise transmitting discovery signals from an antenna using multiple directional signal beams, checking for any reflections of the discovery signals, and analyzing the reflections to detect objects or blockages and to determine the positions of the objects or blockages relative to the antenna.

An action 804 comprises generating a map that indicates the positions of any objects or signal blockages that are detected in the action 802. In some cases, the map may be a three-dimensional map that is based upon a pre-existing static map, with added information as revealed by the beam-based object discovery. More specifically, there may already exist topographical maps showing landscape features, and the objects discovered through discovery may be added to these maps to create a dynamic three-dimensional map that accounts for moving and transient objects and blockages. As mentioned above, the dynamic map may in some cases be generated using machine learning techniques.

An action 806 comprises performing configuration of an antenna or directional signal beam based at least in part on the generated map. In one application, an antenna may be placed in different locations of a proposed base station site, as well as in different orientations. A three-dimensional map may be generated for each position and/or orientation, and the position and/or orientation having the least signal blockage can be selected as the position and/or orientation at which the antenna will be ultimately installed.

In other applications, the action 806 may comprise reconfiguring the beam patterns of directional signal beams to minimize blockages and/or to maximize the unblocked areas of the directional signal beams.

Figure 9:
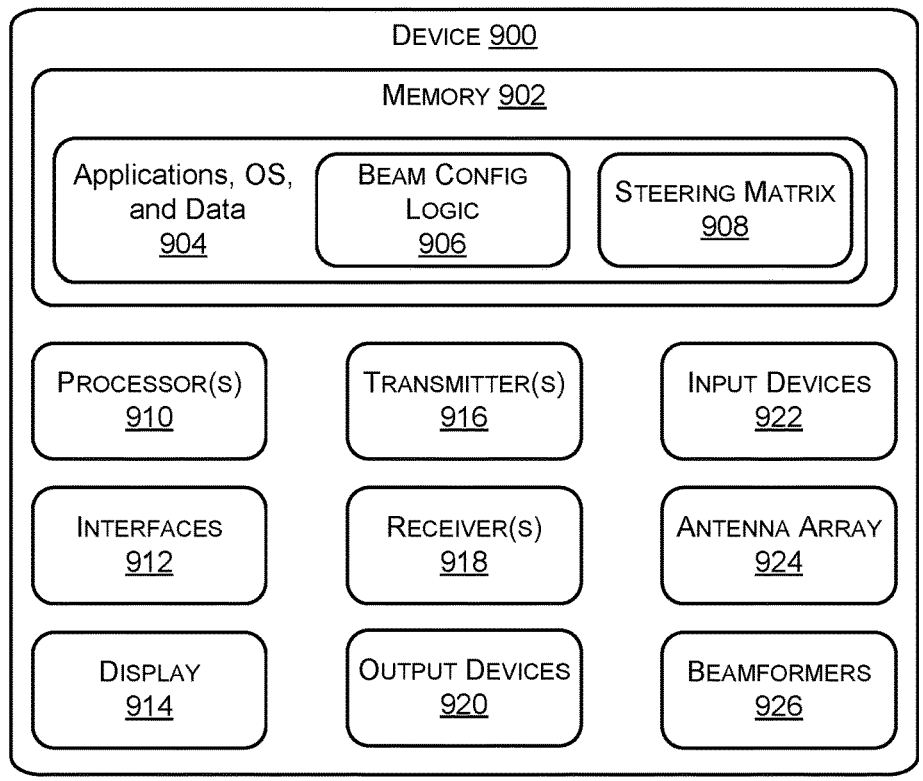
FIG. 9 is a block diagram of an example device, one or more of which can be used to implement various of the components and functionality described herein, such as a user device and a base station.

FIG. 9 illustrates high level components of a device 900 that in which the described methods may be implemented. For example, the device 900 may comprise a user device that communications with a base station. As another example, the device 900 may comprise a computer or computer server, one or more of which can be used as elements of the base station. Generally, the device 800 may comprise any device or combination of devices that can use directional wireless communications, Including such things as computers, routers, access points, hotspots, smartphones, wearable devices, controllers, and so forth. Note that the device 900 may have various other components, in addition to those shown.

The device 900 has memory 902, which may store applications, an operating system (OS), and data 904. Software stored by the memory 902 may include beam configuration logic 906 and other logic to implement the actions of FIG. 7 and/or FIG. 8. The memory 902 may also store a steering matrix 908, comprising multiple steering vectors such as the steering vectors 606 of FIG. 6.

In various embodiments, the memory 902 comprises one or more machine-readable media, which may in turn include volatile and/or non-volatile memory. The memory 902 can also be described as non-transitory computer storage media and may include removable and non-removable media implemented in any method or technology for storage of information, such as computer readable instructions, data structures, program modules, or other data.

Non-transitory computer-readable media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 800.

The device 900 further includes processor(s) 910, interfaces 912, a display 914, a radio transmitter 916, a radio receiver 918, output devices 920, input devices 922, an antenna array 924, and a beamformer 926.

In some embodiments, the processor(s) 906 is a central processing unit (CPU), a graphics processing unit (GPU), or both CPU and GPU, or other processing unit or component known in the art. The processor(s) is configured to execute the beam configuration logic 906, as well as other software of the device 900.

In various embodiments, the interfaces 912 are any sort of interfaces known in the art. The interfaces 912 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 914 may comprise a liquid crystal display or any other type of display commonly used in telecommunication devices or other portable devices. For example, the display 910 may be a touch-sensitive display screen, which may also act as an input device or keypad, such as for providing a soft-key keyboard, navigation buttons, or the like.

The transmitter(s) 916 and receiver(s) 918 may be configured for use with cellular frequency bands, and in some applications the transmitter(s) 916 and receiver(s) 918 may be configured for use with mmWave frequencies, such as frequencies above 30 GHz, for example. In some embodiments, the transmitter(s) 916 and receiver(s) 918 are used by a user device for communicating with a base station, for transmitting discovery signals, and for receiving or detecting reflections of discovery signals. In some embodiments, the transmitter(s) 916 and receiver(s) 918 are used by a base station for communicating for communicating with user devices, for transmitting discovery signals, and for receiving reflections of discovery signals.

In some embodiments, the output devices 920 include any sort of output devices known in the art, such as a display (already described as display 914), speakers, a vibrating mechanism, or a tactile feedback mechanism. The output devices 920 may also include ports for one or more peripheral devices, such as headphones, peripheral speakers, or a peripheral display.

In various embodiments, the input devices 922 include any sort of input devices known in the art. For example, the input devices 922 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The device 900 has an antenna array 924, which as described above may comprise a phased array antenna having multiple individual antenna elements.

The device 900 also has beamformers 926 that are responsive to parameters specified by the steering matrix 908 and to signals received from the antenna array 924 to produce directional signals. The beamformers 926 additionally can be used for transmitting, in which case they drive the elements of the antenna array 924 to produce directional beams in accordance with the parameters of the steering matrix 908.

Although features and/or methodological acts are described above, it is to be understood that the appended claims are not necessarily limited to those features or acts. Rather, the features and acts described above are disclosed as example forms of implementing the claims.

The invention claimed is:

1. One or more components of a mobile communications network, the one or more components being configured to perform actions comprising:
communicating, by one of a base station or a user device of the one or more components, wirelessly and repeatedly with a device through a directional signal beam, the directional signal beam having a configurable beam pattern;
transmitting, by the one of the base station or the user device of the one or more components, a discovery signal using the directional beam, wherein the transmitting is performed before each communication with the device;
detecting, by the one of the base station or the user device of the one or more components transmitting the discovery signal, a reflection of the discovery signal back to the one of the base station or the user device of the one or more components, wherein the reflection is caused by an obstacle in the beam pattern of the directional beam; and
in response to detecting the reflection of the discovery signal, reconfiguring at least one of the beam pattern or the direction of the directional beam.

2. The one or more components of claim 1, the actions further comprising:
obtaining a map that indicates physical features of a coverage area;
detecting an object within the coverage area based at least in part on the reflection of the discovery signal;
augmenting the map to indicate the object;
wherein the reconfiguring is based at least in part on the map.

3. The one or more components of claim 1, the actions further comprising:
transmitting multiple discovery signals through respective ones of multiple directional beams; and
checking for reflections of any of the multiple discovery signals.

4. The one or more components of claim 1, the actions further comprising, in response to detecting the reflection of the discovery signal, reconfiguring beam patterns of multiple directional beams.

5. The one or more components of claim 1, wherein the transmitting is performed repeatedly to detect whether communication with the device is blocked.

6. A method, comprising:
producing, by one of a base station or a user device comprising an antenna, a directional signal beam from the antenna, the directional signal beam having a corresponding beam pattern;
transmitting, by the one of the base station or the user device comprising the antenna, a discovery signal over the directional signal beam, wherein the transmitting is performed before each of multiple communications between the base station and the user device;
detecting, by the one of the base station or the user device transmitting the discovery signal, a reflection of the discovery signal back to the one of the base station or the user device comprising the antenna;
generating, based at least in part on detecting the reflection of the discovery signal, a map that indicates positions of one or more signal blockages relative to the antenna position; and
in response to detecting the reflection of the discovery signal, reconfiguring at least one of the beam pattern or the direction of the directional beam.

7. The method of claim 6, further comprising selecting an antenna position based at least in part on the map.

8. The method of claim 6, further comprising selecting an antenna orientation based at least in part on the map.

9. The method of claim 6, wherein the reconfiguring is based at least in part on the map.

10. The method of claim 6, further comprising:
transmitting multiple discovery signals through respective ones of multiple directional signal beams; and
checking for reflections of any of the multiple discovery signals;
wherein generating the map is based at least in part on the reflections of any of the multiple discovery signals.

11. The method of claim 6, wherein the generating is based at least in part on machine learning.

12. A non-transitory computer-readable medium having programming instructions stored thereon that, when executed by one or more components of a mobile communications network, cause the components to perform operations comprising:
producing, by one of a base station or a user device comprising an antenna, a directional signal beam from the antenna, the directional signal beam having a corresponding beam pattern;
transmitting, by the one of the base station or the user device comprising the antenna, a discovery signal over the directional signal beam, wherein the transmitting is performed before each of multiple communications between the base station and the user device;
detecting, by the one of the base station or the user device transmitting the discovery signal, a reflection of the discovery signal back to the one of the base station or the user device comprising the antenna;
generating, based at least in part on detecting the reflection of the discovery signal, a map that indicates positions of one or more signal blockages relative to the antenna position; and
in response to detecting the reflection of the discovery signal, reconfiguring at least one of the beam pattern or the direction of the directional beam.

13. The non-transitory computer-readable medium of claim 12, wherein the operations further comprise selecting an antenna position based at least in part on the map.

14. The non-transitory computer-readable medium of claim 12, wherein the operations further comprise selecting an antenna orientation based at least in part on the map.

15. The non-transitory computer-readable medium of claim 12, wherein the reconfiguring is based at least in part on the map.

16. The non-transitory computer-readable medium of claim 12, wherein the operations further comprise:
transmitting multiple discovery signals through respective ones of multiple directional signal beams; and
checking for reflections of any of the multiple discovery signals;
wherein generating the map is based at least in part on the reflections of any of the multiple discovery signals.

17. The non-transitory computer-readable medium of claim 12, wherein the generating is based at least in part on machine learning.

\* \* \* \* \*